UNITED STATES PATENT OFFICE.

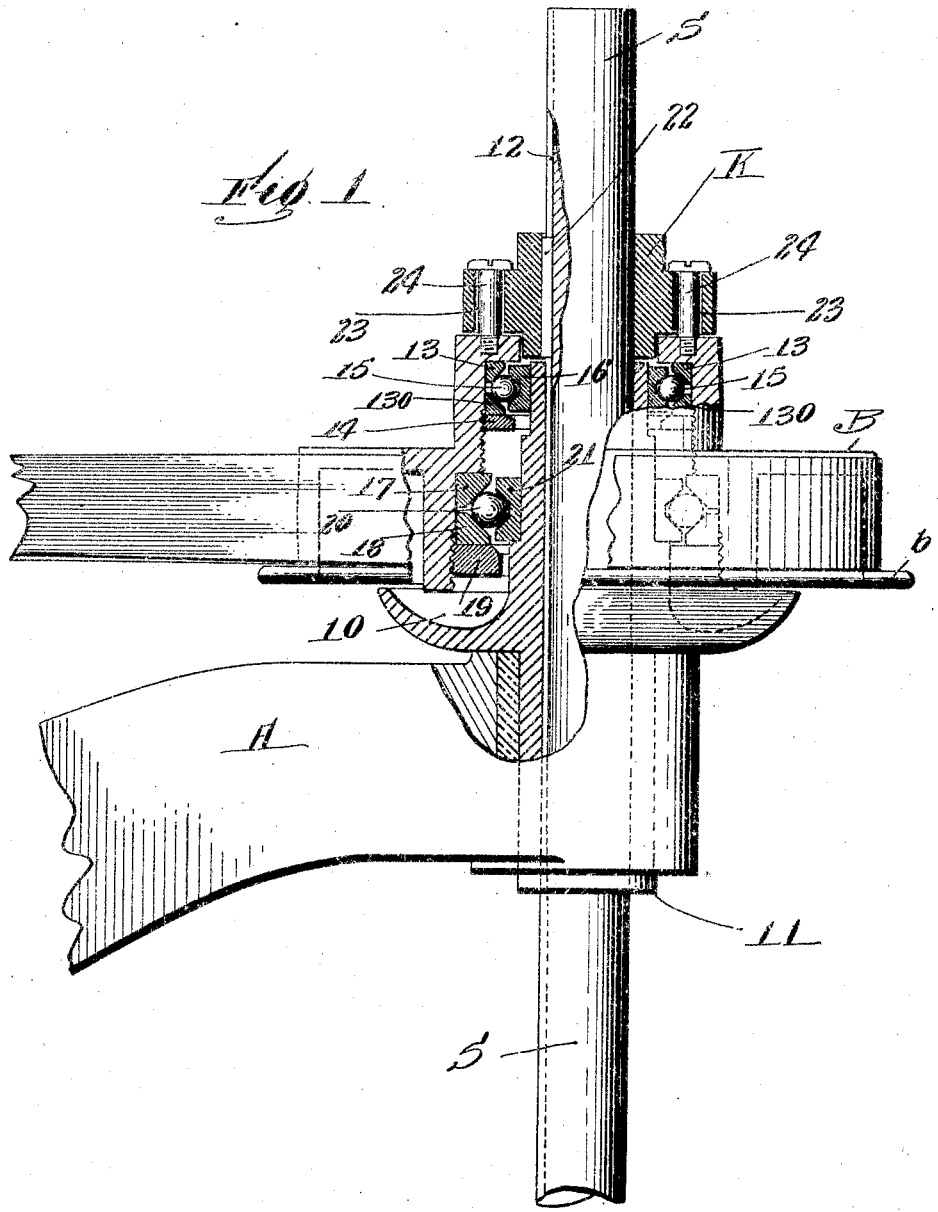

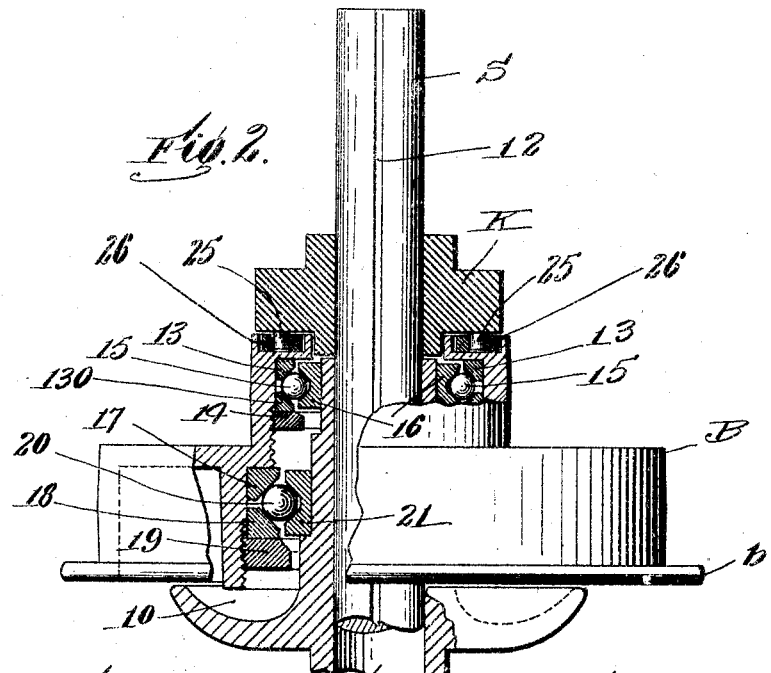
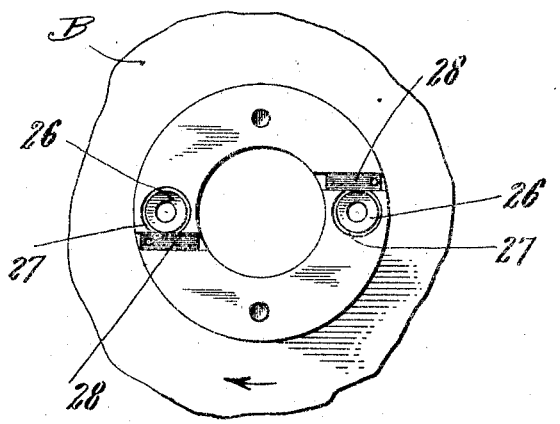
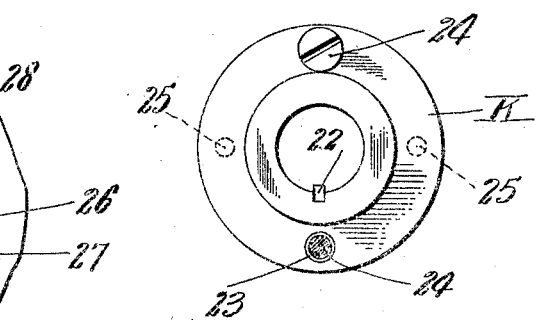
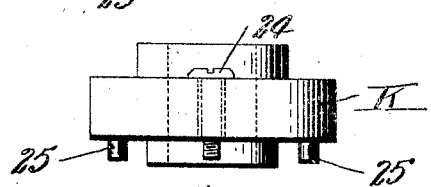
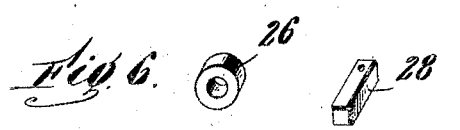
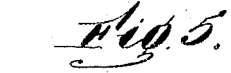

HARDING ALLEN, OF BARRE, MASSACHUSETTS.

DRIVING MECHANISM FOR SPINDLES.

No. 901,515.  Specification of Letters Patent.  Patented Oct. 20, 1908.

Application filed February 2, 1906. Serial No. 299,163.

*To all whom it may concern:*

Be it known that I, HARDING ALLEN, a citizen of the United States, residing at Barre, in the county of Worcester and State of Massachusetts, have invented a new and useful Driving Mechanism for Spindles, of which the following is a specification.

The object of this invention is to provide a new and improved mechanism for driving the spindles of various machines, such as the spindles of drilling machines, tapping machines, etc.

The principal purpose of the invention is to provide a mechanism which can adjust itself to various conditions of use and wear. To accomplish this result I fit the driving pulley on a bushing and drive the spindle by a driving collar, and provide a lost motion connection between the driving pulley and driving collar.

The invention is illustrated in the accompanying two sheets of drawings referring to which, Figure 1 is a side elevation partly in section of the improved construction. Fig. 2 is a sectional view of part of the mechanism shown in Fig. 1, the section being taken at right-angles to Fig. 1. Fig. 3 is a plan view of the top of the cone pulley. Fig. 4 is a plan view of the driving collar through which the power is applied. Fig. 5 is a side elevation thereof. Fig. 6 is a perspective view of one of the driving rollers, and Fig. 7 is a perspective view of one of the faces with which the rollers engage.

Referring to the drawings and in detail, A designates the frame or bracket of the machine. Secured in this bracket is a bushing 11 which is provided with an oil or drip cup 10. Fitted in the bushing 11 is the spindle S which it is desired to drive. The spindle is provided with a key-way 12.

B designates the driving pulley which, in the form shown, is made with two steps and a flange b on the under side of the larger or lower step. The pulley is provided with ball bearings which may be arranged as follows: Fitted in the interior of the driving pulley is a conical bearing piece 13, coöperating with which is an oppositely disposed conical bearing piece 130. The inside of the pulley is interiorly screw-threaded below the piece 130 and threaded into this section of the pulley is an adjustable collar 14. A set of balls 15 is arranged between the parts 13 and 130 to engage a grooved collar 16. The lower part of the hole in the pulley is bored out larger than the upper part and fitted into the same is a conical bearing 17. The lower part of the pulley is also screw-threaded and fitted into the same is an adjustable cone 18 which is adjusted in position by a screw-threaded collar 19 which is arranged in the lower portion of the driving pulley.

A set of balls 20 is arranged between the conical bearing 17 and adjustable cone 18 and the same engage a grooved collar 21. The grooved collars 16 and 21 are bored out just of the size to fit to the bushing 11. By this arrangement, there is a ball bearing engagement of the driving pulley with the bushing 11 and the pulley can turn easily thereon. A driving collar K is arranged on top of the pulley. This collar is provided with a key 22 to engage the keyway 12 in the spindle S. The driving collar K is provided with holes 23—23 loosely fitting in which are headed screws 24—24 which thus serve to prevent axial movement of the driving collar. The driving collar is also provided with depending pins 25—25 fitted on which are hardened steel collars 26—26. These collars fit loosely in holes 27—27 cut in top of the driving pulley B. The driving pulley B is slotted adjacent to the holes 27—27, as indicated in Fig. 3, and fitted in the slots are hardened steel bearing pieces 28—28. By this arrangement, it will be seen that when the driving pulley is revolved, the bearing pieces 28—28 will push on the collars 26—26 and as the collars are practically part of the driving collar K by reason of the pins 25—25, the collar K will be turned in unison with the driving pulley B and hence power will be imparted to the spindle S.

It will be noticed that the spindle S is free to move axially through the driving pulley B and driving collar K.

If the ball bearings, by which the driving pulley engages the bushing 10 become worn, or if the pulley B tends to tip slightly under the heavy tension of the driving pulley, it will be seen that the strain will not be imparted in any way to the driving spindle S to tend to cramp the same in the bushing 11, as there is sufficient play between the collars 26—26, the holes 27—27, the screws 24—24, and the holes 23—23 in the driving collar K in which they fit. The headed screws 24—24 are not screwed down tightly but a little play is left under the heads to allow for the tipping of the driving pulley B. Hence the driving pulley B is free to adjust itself properly and the rotation thereof is imparted to the driving collar K in such way that there can be no cramping of the spindle S in its bushing 11. In this way, an efficient mechanism is provided for the purpose stated.

The details and arrangements herein shown and described, may be greatly varied by a skilled mechanic without departing from the scope of my invention as expressed in the claims.

Having thus fully described my invention, what I claim and desire to secure by Letters-Patent of the United States is:—

1. In a device for the purpose stated, the combination of a bushing, a driving pulley running thereon, a driving collar, a spindle running through the bushing and engaging the driving collar, and a lost-motion connection between the driving pulley and driving collar.

2. In a device for the purpose stated, the combination of a bushing, a driving pulley running on said bushing, a driving collar on the top of said driving pulley, a spindle fitted in said bushing and said driving collar, said spindle having a key-way cut therein, a key fitted in said driving collar and engaging a key-way of a spindle, and a lost-motion connection between the driving collar and driving pulley.

3. In a device for the purpose stated, the combination of a bushing, a driving pulley running thereon, a driving collar on top of the driving pulley, a spindle fitted in said bushing and in said driving collar and having a key-way therein, a key fitted in said driving collar and engaging said key-way, pins depending from said driving collar, and rollers mounted on said pins, said driving pulley having faces engaging said rollers.

4. In a device for the purpose stated, the combination of a bushing, a driving pulley running thereon, a driving collar on top of the driving pulley, a spindle fitted in said bushing and in said driving collar and having a key-way therein, a key fitted in said driving collar and engaging said key-way, pins depending from said driving collar, rollers mounted on said pins, and bearing pieces in said driving pulley engaging said rollers.

5. In a device for the purpose stated, the combination of a bushing, a driving pulley having a ball-bearing engagement therewith, a driving collar on top of the driving pulley, a spindle fitted in said bushing and in said driving collar and having a key-way therein, a key fitted in said driving collar and engaging said key-way, pins depending from said driving collar, rollers on said pins, said driving pulley having holes in which said rollers loosely fit, and slots, and bearing pieces fitted in said slots for engaging said rollers.

6. In a device for the purpose stated, the combination of a bushing, a driving pulley having a ball-bearing engagement therewith, a driving collar on top of the driving pulley having holes therethrough, a spindle fitted in said bushing and in said driving collar and having a key-way therein, a key fitted in said driving collar and engaging said key-way, pins depending from said driving collar, rollers mounted on said pins, said driving pulley having holes in which said rollers loosely fit, bearing pieces arranged in said driving pulley to engage said rollers, and headed screws tapped into said driving pulley and loosely passing through said holes in the driving collar.

7. In a driving mechanism, the combination of a bushing having a plurality of steps thereon, a shaft passing through said bushing, a driving collar fixed to said shaft, a pulley, means for loosely connecting said collar and pulley, a grooved collar on each of the steps of said bushing, conical bearing pieces mounted on the inside of said pulley, and bearing balls located between the several grooved collars and their respective conical bearing pieces.

In testimony whereof I have hereunto set my hand, in the presence of two subscribing witnesses.

HARDING ALLEN.

Witnesses:
LOUIS W. SOUTHGATE,
MARY E. REGAN.